(12) United States Patent
Ninomiya et al.

(10) Patent No.: US 11,361,782 B2
(45) Date of Patent: Jun. 14, 2022

(54) ABNORMAL NOISE DETERMINATION APPARATUS AND METHOD

(71) Applicant: Honda Motor Co., Ltd., Tokyo (JP)

(72) Inventors: Kazushi Ninomiya, Tochigi (JP); Yasutaka Ishizuka, Tochigi (JP); Ayanori Nagata, Tochigi (JP); Toshiki Iida, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/202,113

(22) Filed: Mar. 15, 2021

(65) Prior Publication Data

US 2021/0304785 A1 Sep. 30, 2021

(30) Foreign Application Priority Data

Mar. 24, 2020 (JP) .............................. JP2020-053385

(51) Int. Cl.
*G10L 25/51* (2013.01)
*H04R 1/40* (2006.01)
*H04R 3/00* (2006.01)
*B60R 11/02* (2006.01)
(Continued)

(52) U.S. Cl.
CPC .......... *G10L 25/51* (2013.01); *B60R 11/0247* (2013.01); *G10L 25/18* (2013.01); *H04R 1/406* (2013.01); *H04R 3/005* (2013.01); *B60R 2011/0003* (2013.01); *H04R 2201/401* (2013.01); *H04R 2499/13* (2013.01)

(58) Field of Classification Search
None
See application file for complete search history.

(56) References Cited

U.S. PATENT DOCUMENTS

| 2005/0177352 A1* | 8/2005 | Gravel | ................... G01H 3/08 703/2 |
| 2019/0114849 A1* | 4/2019 | Lee | ................... G07C 5/008 |
| 2019/0295567 A1* | 9/2019 | Sudo | ................... G10L 25/51 |

FOREIGN PATENT DOCUMENTS

| JP | H11142231 A | 5/1999 |
| JP | 2001108518 A | 4/2001 |
| JP | 6089948 B2 | 3/2017 |

OTHER PUBLICATIONS

Japanese office action; Application 2020-053385; dated Dec. 28, 2021.

* cited by examiner

*Primary Examiner* — Paul W Huber
(74) *Attorney, Agent, or Firm* — Duft & Bornsen, PC

(57) ABSTRACT

An abnormal noise determination apparatus including a microphone array disposed inside a vehicle and an electronic control unit including a microprocessor. The microprocessor is configured to perform acquiring an abnormal noise data on an abnormal noise generated by a sound source disposed in a predetermined position inside the vehicle, the abnormal noise data including an information on a strength and a generation direction of the abnormal noise collected by the microphone array in advance or assumed to be collected by the microphone array; acquiring a traveling noise data including an information on a strength and a generation direction of a traveling noise collected by the microphone array during traveling of the vehicle; and determining whether the abnormal noise is included in the traveling noise of the vehicle, based on the abnormal noise data acquired and the traveling noise data acquired.

13 Claims, 6 Drawing Sheets

(51) Int. Cl.
*G10L 25/18* (2013.01)
*B60R 11/00* (2006.01)

ABNORMAL NOISE DETERMINATION APPARATUS AND METHOD

CROSS-REFERENCE TO RELATED APPLICATION

This application is based upon and claims the benefit of priority from Japanese Patent Application No. 2020-053385 filed on Mar. 24, 2020, the content of which is incorporated herein by reference.

BACKGROUND OF THE INVENTION

Field of the Invention

This invention relates to an abnormal noise determination apparatus and an abnormal noise determination method configured to determine whether abnormal noise is generated during travel of a vehicle.

Description of the Related Art

Conventionally, there is a known apparatus of this type in which noise data acquired during vehicle running is calculated as a waveform of a frequency and a sound pressure level in a predetermined frequency range by frequency analysis, and the presence or absence of abnormal noise is determined by using the waveform data. Such an apparatus is described, for example, in Japanese Patent Publication No. 6089948 (JP6089948B).

However, since the apparatus described in JP6089948B simply determines whether abnormal noise is generated based on the sound pressure level without considering the direction in which abnormal noise is generated, it is difficult to accurately perform abnormal noise determination.

SUMMARY OF THE INVENTION

An aspect of the present invention is an abnormal noise determination apparatus including a microphone array disposed inside a vehicle and including a plurality of microphones, and an electronic control unit including a microprocessor and a memory connected to the microprocessor. The microprocessor is configured to perform: acquiring an abnormal noise data on an abnormal noise generated by a sound source disposed in a predetermined position inside the vehicle, the abnormal noise data including an information on a strength and a generation direction of the abnormal noise collected by the microphone array in advance or assumed to be collected by the microphone array; acquiring a traveling noise data including an information on a strength and a generation direction of a traveling noise collected by the microphone array during traveling of the vehicle; and determining whether the abnormal noise is included in the traveling noise of the vehicle, based on the abnormal noise data acquired and the traveling noise data acquired.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereafter, an embodiment of the present invention is explained with reference to FIGS. 1 to 8. An abnormal noise determination apparatus according to the embodiment of the present invention is an apparatus for determining whether abnormal noise is generated during travel of a vehicle. For example, completed vehicles manufactured in a factory have be subjected to an inspection step before being shipped. In the inspection step, whether abnormal noise is generated is determined by causing the individual completed vehicles to actually travel. However, if workers who ride on the completed vehicles determine whether abnormal noise is generated, on the basis of their sense of hearing in the inspection step, the determination greatly varies among the workers due to their subjectivity.

For this reason, to accurately determine whether abnormal noise is generated, it is preferred to previously acquire data on abnormal noise that can be generated during travel of a vehicle and for a separate determination apparatus to determine whether abnormal noise is generated in a completed vehicle by making a comparison between the sound pressure of the abnormal noise data and the sound pressure of data on traveling noise obtained by causing the completed vehicle to travel. However, in this case, even if abnormal noise and traveling noise are generated in quite different positions (for example, abnormal noise is generated in a front portion of the vehicle and traveling noise is generated in a rear portion thereof), it may be determined that abnormal noise is generated. That is, it is difficult to make an accurate abnormal noise determination. For this reason, the abnormal noise determination apparatus according to the present embodiment is configured as follows so that an accurate abnormal noise determination is made.

Figure 1:
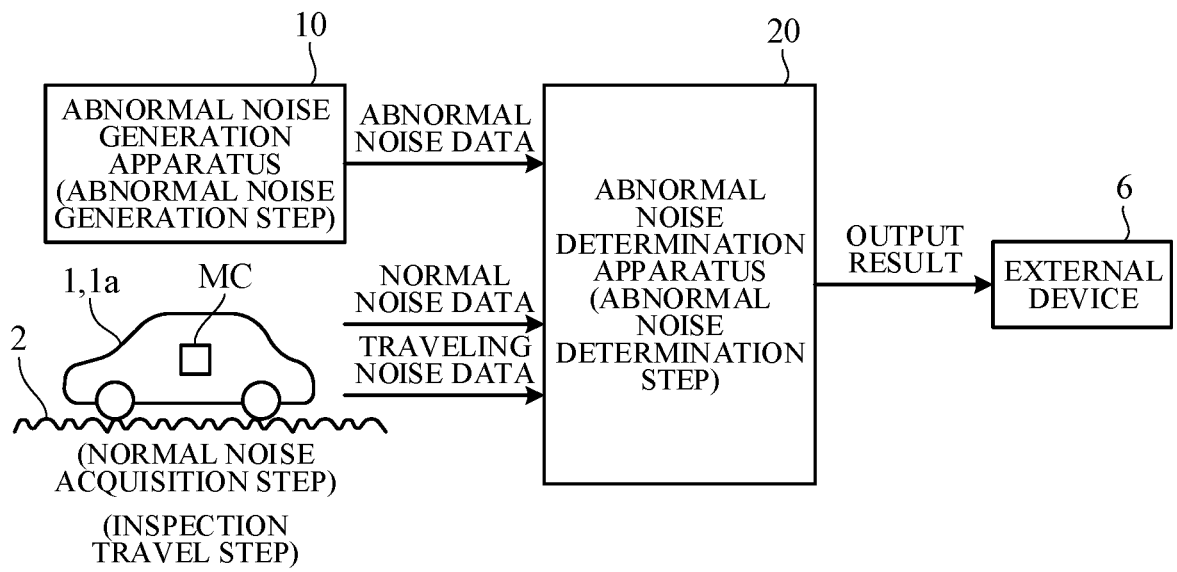
FIG. 1 is a diagram schematically showing the flow of an abnormal noise determination process when determining whether an abnormal noise is generated using an abnormal noise determination apparatus according to an embodiment of the present invention.

FIG. 1 is a drawing schematically showing the flow of a vehicle abnormal noise determination process. Hereafter, a completed vehicle to be subjected to an inspection step may be referred to as the "inspection vehicle." As shown in FIG. 1, to determine whether abnormal noise is generated in each inspection vehicle 1, first, an abnormal noise generation apparatus 10 generates multiple pieces of abnormal noise data serving as criteria for making an abnormal noise determination. For example, the abnormal noise generation apparatus 10 generates multiple types of abnormal noise data for each of the types of inspection vehicles 1 (abnormal noise generation step).

To generate abnormal noise data, a normal vehicle 1a, which is of the same type as any inspection vehicle 1 and does not generate abnormal noise (referred to as the "reference vehicle"), is previously caused to travel on an inspection course having a predetermined road surface 2 (Belgian road surface), such as stone pavement, at a predetermined speed. A microphone MC (an internal microphone 13 to be discussed later) is disposed in a predetermined position (e.g., center console) of the reference vehicle 1a, and the normal traveling noise of the reference vehicle 1a is collected by the microphone MC to acquire normal noise data (normal noise acquisition step).

Then, as in the normal noise acquisition step, the inspection vehicle 1 to be subjected to the inspection step is caused to travel on the inspection course having the predetermined road surface 2 at the predetermined speed. In the inspection vehicle 1 also, a microphone MC (an internal microphone 13 to be discussed later) is disposed in a predetermined position (e.g., center console), and the traveling noise of the inspection vehicle 1 is collected using the microphone MC to acquire traveling noise data (inspection travel step).

Then, the abnormal noise determination apparatus 20 determines whether abnormal noise is generated, on the basis of the abnormal noise data generated by the abnormal noise generation apparatus 10, the normal noise data obtained by the previous travel of the reference vehicle 1a, and the traveling noise data obtained in the travel test of the inspection vehicle 1 (abnormal noise determination step). For example, if the traveling noise data matches one of the types of abnormal noise data, the abnormal noise determination apparatus 20 determines that abnormal noise is generated. On the other hand, if the traveling noise data matches the normal noise data, or if the traveling noise data does not match any of the types of abnormal noise data, the abnormal noise determination apparatus 20 determines that no abnormal noise is generated.

The determination made by the abnormal noise determination apparatus 20 is outputted to an external device 6, such as a monitor, so that the worker can recognize the determination. The inspection vehicle 1 about which it has been determined that abnormal noise is generated is reinspected. In the reinspection, the inspection vehicle 1 is vibrated using a vibrator. If abnormal noise is generated again, the abnormal noise data generated by the abnormal noise generation apparatus 10 and the abnormal noise determination made by the abnormal noise determination apparatus 20 are regarded as being sufficiently reliable.

Figure 2:
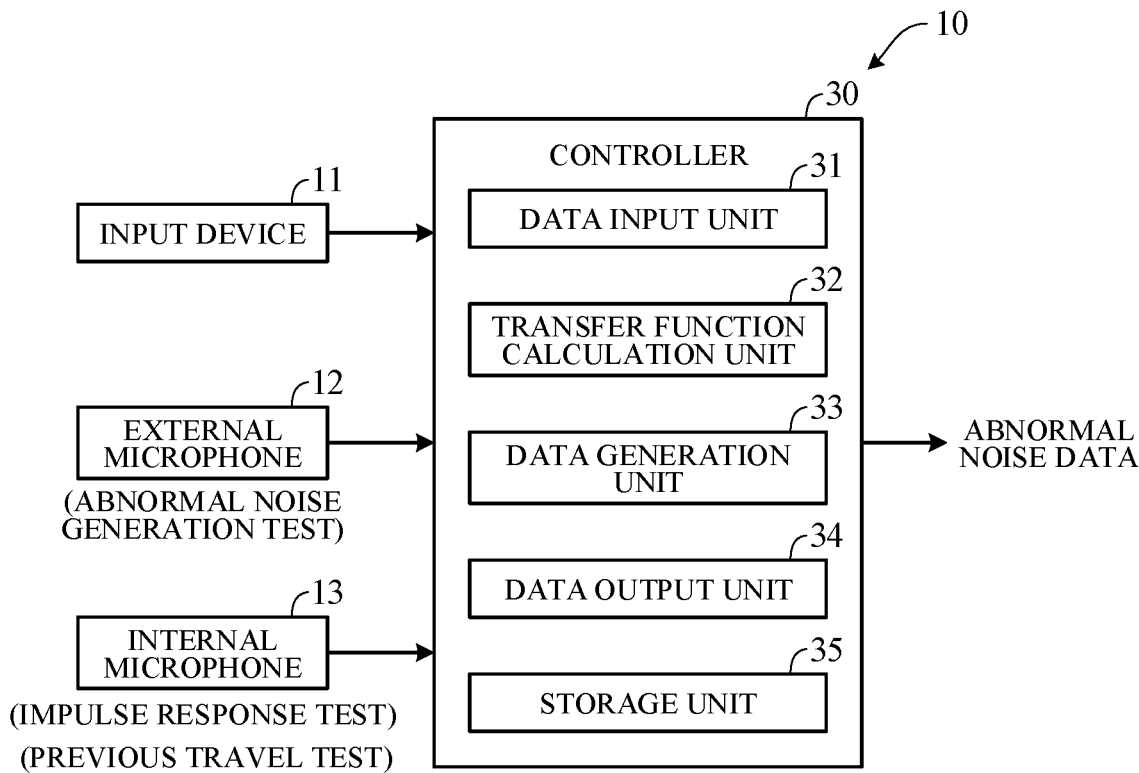
FIG. 2 is a block diagram showing a configuration of main components of an abnormal noise generation apparatus of FIG. 1.

The abnormal noise generation apparatus 10 is able to generate abnormal noise data using various techniques. The configuration of the abnormal noise generation apparatus 10 will be described below. FIG. 2 is a block diagram showing the configuration of main components of the abnormal noise generation apparatus 10. As shown in FIG. 2, the abnormal noise generation apparatus 10 includes an input device 11, an external microphone 12, an internal microphone 13, and a controller (an electronic control unit) 30. The input device 11 is a device used by the worker to input commands related to generation or determination of abnormal noise data (e.g., an abnormal noise data generation command or inspection start command) and consists of a keyboard, a mouse, a touchscreen, or the like.

The external microphone 12 is an acoustic device that converts an inputted sound into an electric signal and outputs it, and consists of a single microphone. The external microphone 12 is used to collect abnormal noise generated in an abnormal noise generation test previously conducted in a laboratory or the like outside the vehicle. An abnormal noise generation test is a test for causing a single part or combined multiple parts mounted on the inspection vehicle 1 to generate abnormal noise and is conducted using, for example, an abnormal noise generation tester.

Figure 3:
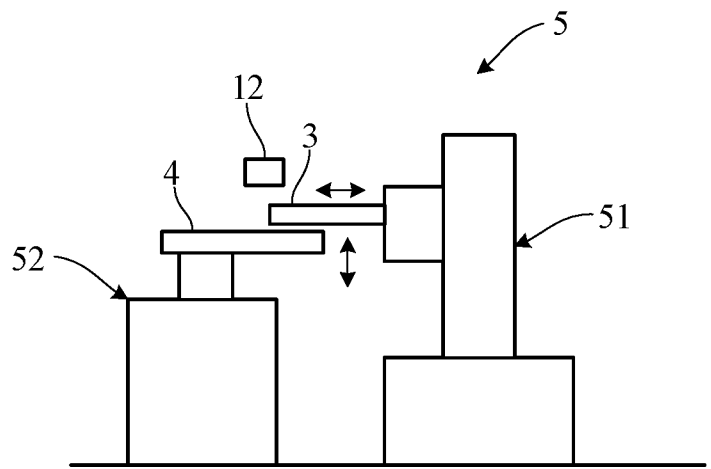
FIG. 3 is a diagram showing a schematic configuration of an abnormal noise generation tester used in an abnormal noise generation test.

FIG. 3 is a drawing showing a schematic configuration of an abnormal noise generation tester 5. FIG. 3 shows a pair of parts disposed adjacent to each other on the inspection vehicle 1, that is, a first part 3 and a second part 4. For example, the first part 3 and second part 4 are spaced from each other by a predetermined clearance, or closely fastened to each other. For example, the first part 3 and second part 4 are formed of a resin material or a metal. One of the first part 3 and second part 4 may be formed of a resin material, and the other may be formed of a metal.

As shown in FIG. 3, the abnormal noise generation tester 5 includes a first support unit 51 that supports the first part 3 and a second support unit 52 that supports the second part 4. The first part 3 and second part 4 are disposed so as to face each other in the up-down direction. The first support unit 51 is configured to, when activated by an actuator (not shown), move the first part 3 in the up-down and horizontal directions as shown by arrows in FIG. 3. By moving the first part 3 in the up-down direction, the first part 3 collides with the second part 4, generating hitting noise. By moving the first part 3 in the horizontal direction, the first part 3 slides with respect to the second part 4, generating friction noise. The external microphone 12 is disposed near the contact portions of the first part 3 and second part 4 to collect such hitting noise or friction noise.

The abnormal noise generation tester 5 may have any configuration as long as the first part 3 moves relative to the second part 4 and generates abnormal noise. For example, the second part 4 may be disposed so as to be movable in the up-down and horizontal directions, or both the first part 3 and second part 4 may be movably disposed. Use of the abnormal noise generation tester 5 allows for generating noise caused by looseness of the parts fastened to each other, a fall or misalignment of any part, or the like, that is, various patterns of abnormal noise that cannot be generated by the inspection vehicle 1 that is normally assembled. For example, the abnormal noise generation tester 5 is able to generate abnormal noise, such as hitting noise generated by collision of the first part 3 with the second part 4 or friction noise generated by slide of the first part 3 with respect to the second part 4.

Abnormal noise may be generated by mounting parts to the inspection vehicle 1 intentionally in a faulty manner without using the abnormal noise generation tester 5. For example, with a bolt for fixing a seat loosened, the worker may generate abnormal noise by vibrating the seat of the inspection vehicle 1 or a vibrator may generate abnormal noise by vibrating the entire inspection vehicle 1, and the generated abnormal noise may be collected using a microphone disposed near the abnormal noise source (seat). A part around the instrument panel may be rattled, and the then abnormal noise may be collected using a microphone. The sound data obtained in the abnormal noise generation test is sound data serving as the reference of abnormal noise data and is hereafter referred to as the "reference abnormal noise data."

The internal microphone 13 in FIG. 2 is an acoustic device that consists of a microphone array including multiple microphones and is disposed in a predetermined position (e.g., center console) of each of the inspection vehicle 1 and reference vehicle 1*a*. The internal microphone 13 is used in an impulse response test conducted in a laboratory or the like using the inspection vehicle 1 or reference vehicle 1*a*. In the impulse response test, the transfer functions of sounds transferred from predetermined positions of the inspection vehicle 1 or reference vehicle 1*a* to the internal microphone 13 are obtained. The internal microphone 13 is also used in a previous travel test for obtaining normal noise data during travel of the inspection vehicle 1. The internal microphone 13 is also used to obtain traveling noise data by causing the inspection vehicle 1 to travel in the inspection travel step (FIG. 1).

Figure 4:
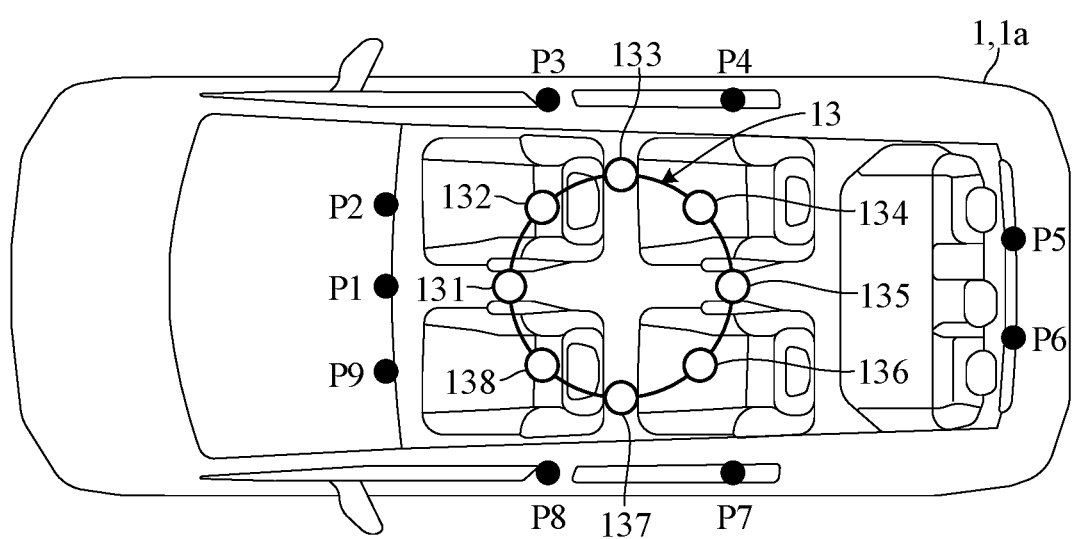
FIG. 4 is a plan view schematically showing a relationship between a disposition of an internal microphone of FIG. 2 and positions of abnormal noise sound sources in an impulse response test.

FIG. 4 is a plan view schematically showing the disposition of the internal microphone 13. As shown in FIG. 4, the internal microphone 13 includes multiple microphones disposed in different positions, for example, eight microphones 131 to 138 disposed in the circumferential direction. Hereafter, the microphones 131 to 138 may be referred to as the "first to eighth microphones 131 to 138." Although the first to eighth microphones 131 to 138 are disposed close to each other in the unit of the internal microphone 13 on the center console, such disposition is shown in an exaggerated manner in FIG. 4. The first microphone 131 is disposed in the center in the width direction of the vehicle so as to face the instrument panel and forms a microphone serving as the reference in sound collection, that is, a reference microphone.

The impulse response test is a test in which speakers (not shown) are disposed in multiple sound source positions (e.g., sound source positions P1 to P9) around the internal microphone 13 and the impulse responses of the speakers serving as sound sources are measured by the internal microphone 13. The sound source positions P1 to P9 correspond to the positions in which the first part 3 and second part 4 used in the abnormal noise generation test are actually disposed in the inspection vehicle 1. The sound source positions P1 to P9 may differ from the positions in which the first part 3 and second part 4 are disposed.

The impulse responses are measured by the first to eighth microphones 131 to 138. By Fourier transforming the measured pieces of noise data, the transfer functions of the sounds in the transmission paths from the sound source positions P1 to P9 to the microphones 131 to 138 are calculated.

By convolving the reference abnormal noise data obtained in the abnormal noise generation test and serving as input data with the transfer functions obtained from the impulse responses, sound output data collected by the microphones 131 to 138 is obtained. This output data corresponds to sound data obtained by the microphones 131 to 138 when abnormal noise emitted from the abnormal noise sources are attenuated and transmitted to the microphones 131 to 138. Multiplying the reference abnormal noise data of the abnormal noise sources by the transfer functions corresponds to multiplying the reference abnormal noise data by the attenuation rates of the transmission paths of the sounds.

The previous travel test is a travel test conducted in a manner similar to that of the inspection travel step of FIG. 1. Traveling noise data obtained in the previous travel test is normal noise data obtained when the inspection vehicle 1 is caused to travel at a predetermined speed. That is, the previous travel test is a travel test conducted provided that abnormal noise is not generated.

Whether the traveling noise data obtained in the previous travel test is normal is determined, for example, by frequency analyzing the traveling noise data to obtain a power spectrum representing the relationship between the frequency and sound pressure and determining whether the sound pressure data in a predetermined frequency range exceeds a predetermined threshold, on the basis of this power spectrum. The normal noise data obtained in the previous travel test is collected by the microphones 131 to 138.

As shown in FIG. 2, the input device 11, external microphone 12, and internal microphone 13 are connected to the controller 30, and signals from these components are inputted to the controller 30. Signals from the external microphone 12 or internal microphone 13 may be inputted to the controller 30 through a wireless unit by wireless communication. For example, the controller 30 is a computer disposed in a laboratory or analysis room and includes an arithmetic processing device including a CPU (microprocessor), a memory such as a ROM or RAM, and other peripheral circuits.

The controller 30 includes, as functional elements, a data input unit 31, a transfer function calculation unit 32, a data generation unit 33, a data output unit 34, and a storage unit 35. The data input unit 31, transfer function calculation unit 32, data generation unit 33, and data output unit 34 are functions performed by the CPU, and the storage unit 35 is a function performed by the memory.

The data input unit 31 receives the sound data collected by the external microphone 12, that is, the reference abnormal noise data previously obtained in the abnormal noise generation test. The data input unit 31 also receives the sound data collected by the internal microphone 13, that is, the sound data obtained in the impulse response test, and the normal noise data obtained in the previous travel test. These pieces of noise data received by the data input unit 31 are stored in the storage unit 35.

The transfer function calculation unit 32 uses the sound data obtained in the impulse response test among the pieces of sound data inputted through the data input unit 31 to calculate the transfer functions of the sounds in the transmission paths from the sound source positions P1 to P9 to the microphones 131 to 138. The calculated transfer functions are stored in the storage unit 35.

The data generation unit 33 generates abnormal noise data on the basis of the reference abnormal noise data inputted through the data input unit 31, the transfer functions calculated by the transfer function calculation unit 32, and the normal noise data. More specifically, the data generation unit 33 generates abnormal noise data as mixed noise by convoluting the reference abnormal noise data with the transfer functions and adding the normal noise data. In this case, the data generation unit 33 uses the transfer functions calculated for the microphones 131 to 138 and the pieces of normal noise data collected by the microphones 131 to 138 so as to correspond to the pieces of sound data collected by the microphones 131 to 138. Thus, the data generation unit 33 generates pieces of abnormal noise data corresponding to the microphones 131 to 138.

The generated pieces of abnormal noise data are pieces of abnormal noise data supposed to be collected by the microphones 131 to 138 when pieces of abnormal noise having a predetermined pattern are generated by the sound sources disposed in the positions P1 to P9 in the inspection vehicle 1 traveling at the predetermined speed. For example, the data generation unit 33 starts to generate abnormal noise data when an abnormal noise data generation command is inputted through the input device 11. The data generation unit 33 adds, to the generated pieces of abnormal noise data, information on the type of abnormal noise, such as hitting noise or friction noise, and information on the position of the abnormal noise source indicating which of the positions P1 to P9 the abnormal noise source is and stores the resulting pieces of abnormal noise data in the storage unit 35.

The data generation unit 33 is able not only to generate the abnormal noise data as mixed noise using the transfer functions but also to generate abnormal noise data using the traveling noise data obtained by the internal microphone 13 when the reference vehicle 1a is caused to travel in the previous travel test. That is, the data generation unit 33 may store, in the storage unit 35 as abnormal noise data, traveling noise data when the reference vehicle 1a generates abnormal noise during travel. This abnormal noise data is pieces of abnormal noise data corresponding to the microphones 131 to 138.

The data output unit 34 outputs the abnormal noise data generated by the data generation unit 33 to the abnormal noise determination apparatus 20 of FIG. 1. That is, the data output unit 34 outputs the abnormal noise data serving as mixed noise calculated using the transfer functions, or the abnormal noise data actually acquired by the internal microphone 13 during travel of the vehicle. The data output unit 34 also outputs the normal noise data obtained in the previous travel test received through the data input unit 31 together with the abnormal noise data.

Figure 5:
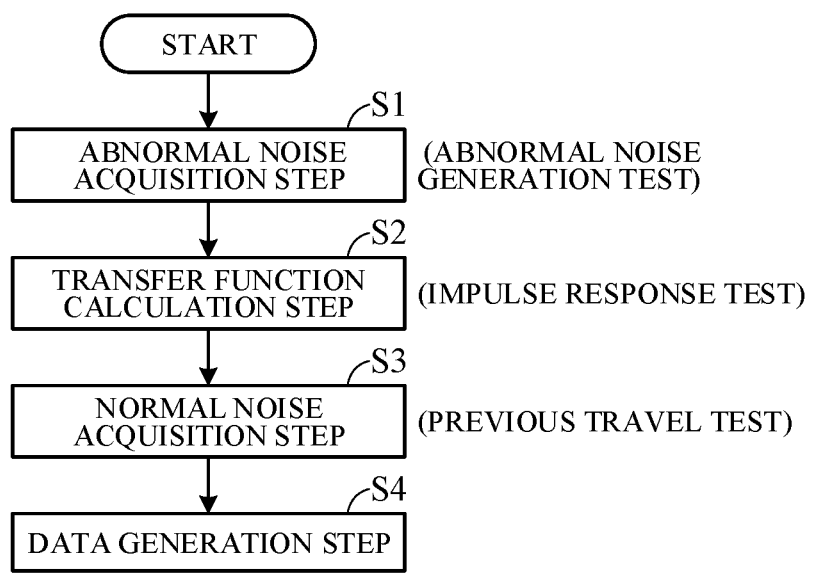
FIG. 5 is a flowchart showing an example of processing by an abnormal noise determination method according to the embodiment of the invention.

The above abnormal noise data generation process performed by the abnormal noise generation apparatus 10 and, specifically, the process of generating abnormal noise data as mixed noise is summarized as shown in FIG. 5. First, in S1, the abnormal noise generation test is conducted using the parts 3 and 4 actually mounted on the inspection vehicle 1 (FIG. 3). Then, the abnormal noise generation apparatus 10 acquires the abnormal noise data generated in the abnormal noise generation test, that is, the reference abnormal noise data generated by hitting, friction, or the like between the first part 3 and 4 through the external microphone 12 (abnormal noise acquisition step).

Then, in S2, the impulse response test is conducted using the predetermined positions P1 to P9 of the inspection vehicle 1 as sound sources for each type of inspection vehicle 1 (FIG. 4). In the impulse response test, the impulse responses of the sound sources disposed in the positions P1 to P9 are measured by the internal microphone 13. By Fourier transforming the measured impulse responses, the abnormal noise generation apparatus 10 calculates the transfer functions of the transmission paths from the positions P1 to P9 to the internal microphone 13 (transfer function calculation step).

Then, in S3, the previous travel test is conducted by previously causing the reference vehicle 1a to travel on the inspection course having the predetermined road surface 2. In the previous travel test, the abnormal noise generation apparatus 10 acquires the normal noise data through the internal microphone 13 (normal noise acquisition step).

Finally, in S4, the abnormal noise generation apparatus 10 generates the pieces of abnormal noise data by convoluting the reference abnormal noise data acquired in S1 with the transfer functions calculated in S2 and adding the normal noise data acquired in S3 to the resulting values (data generation step). The process of FIG. 5 is only illustrative. For example, the normal noise acquisition step may be performed before the abnormal noise acquisition step, and the transfer function calculation step may be performed before the abnormal noise acquisition step.

Figure 6:
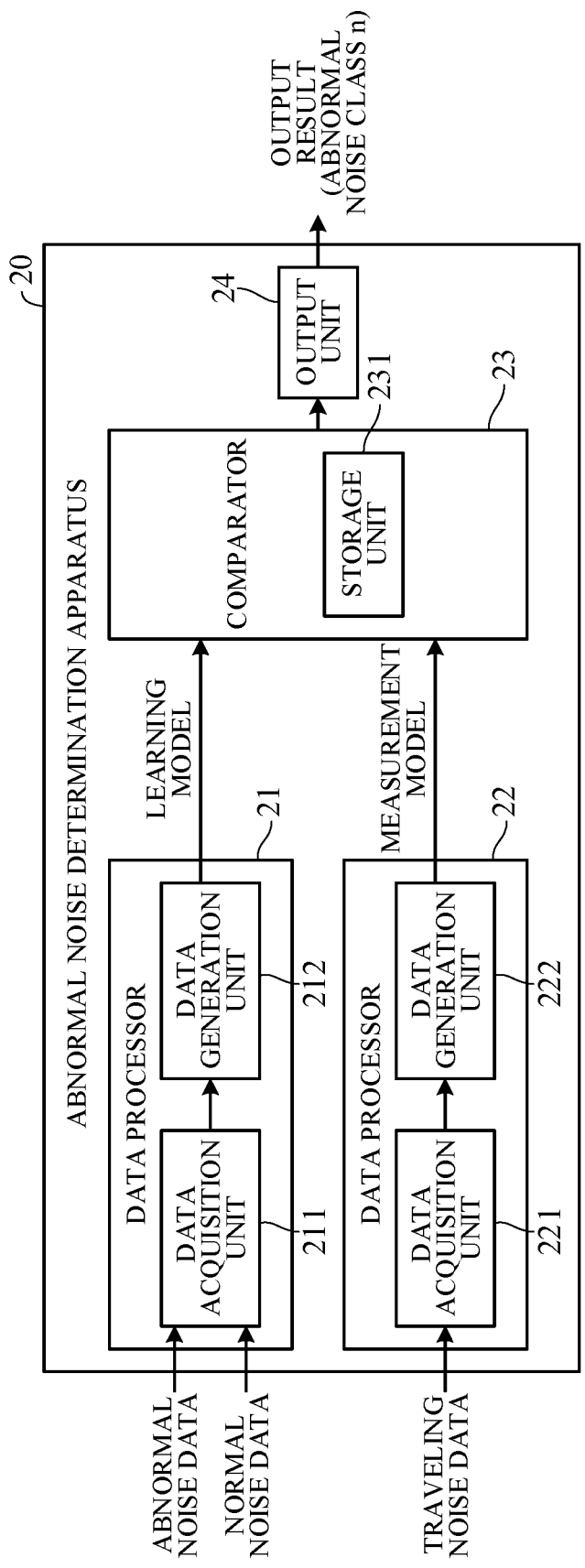
FIG. 6 is a block diagram showing a schematic configuration of an abnormal noise determination apparatus according to the embodiment of the invention.

Next, the configuration of the abnormal noise determination apparatus 20 of FIG. 1 will be described. FIG. 6 is a block diagram showing the configuration of main functional components of the abnormal noise determination apparatus 20. The abnormal noise determination apparatus 20 consists of a controller (an electronic control unit) including an arithmetic processing unit that includes a CPU (microprocessor), a memory such as a ROM or RAM, and other peripheral circuits. The abnormal noise determination apparatus 20 is disposed in a laboratory or analysis room, or disposed in the inspection vehicle 1. The abnormal noise determination apparatus 20 may be included in the controller forming a part of the abnormal noise generation apparatus 10. That is, the single controller may function as both the abnormal noise generation apparatus 10 and abnormal noise determination apparatus 20.

As shown in FIG. 6, the abnormal noise determination apparatus 20 includes a data processor 21 that processes the abnormal noise data and normal noise data outputted from the abnormal noise generation apparatus 10, a data processor 22 that processes the traveling noise data obtained in the inspection travel step, a comparator 23 that makes a comparison between a learning model outputted through the data processor 21 and a measurement model outputted through the data processor 22, and an output unit 24 that outputs the comparison made by the comparator 23 to the outside.

The data processor 21 includes a data acquisition unit 211 that acquires the abnormal noise data and normal noise data and a data generation unit 212 that generates data on a learning model by processing the abnormal noise data and normal noise data acquired by the data acquisition unit 211. The data processor 22 includes a data acquisition unit 221 that acquires the traveling noise data and a data generation unit 222 that generates data on a measurement model by processing the traveling noise data acquired by the data acquisition unit 221. The comparator 23 includes a storage unit 231 that stores the learning model.

The data acquisition unit 211 acquires abnormal noise data classified by the abnormal noise generation apparatus 10. Specifically, the abnormal noise generation apparatus 10 generates abnormal noise data such that the abnormal noise data is classified as one of abnormal noise classes 1 to N, in accordance with the type (hitting noise, friction noise, etc.) and position (one of the positions P1 to P9) of the abnormal noise, and the abnormal noise data acquired by the data processor 21 corresponds to one (e.g., abnormal noise class n) of the multiple abnormal noise classes 1 to N. The data acquisition unit 211 also acquires normal noise data of abnormal noise class 0.

Figure 7:
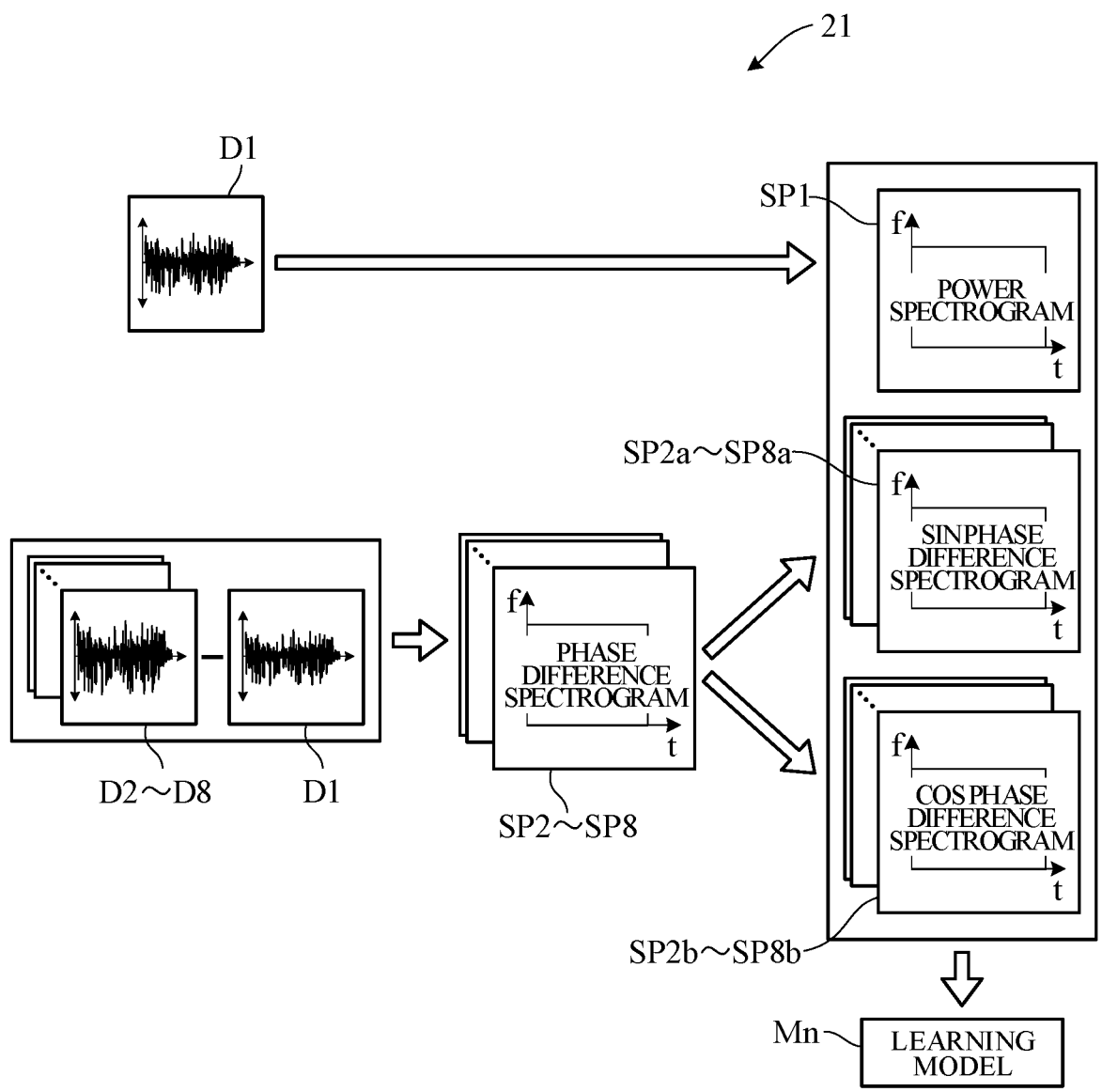
FIG. 7 is a diagram specifically showing a flow of data from a data processor to a comparator for processing the abnormal noise data of FIG. 6.

FIG. 7 is a diagram specifically showing the flow of data from the data processor 21 to comparator 23. Hereafter, pieces of abnormal noise data as mixed noise supposed to be collected by the first to eighth microphones 131 to 138, or pieces of abnormal noise data collected by the first to eighth microphones 131 to 138 are referred to as the "first to eighth abnormal noise data D1 to D8 for convenience. As shown in FIG. 7, the first to eighth abnormal noise data D1 to D8 are pieces of noise data representing the relationship between the time (lateral axis) and sound pressure (longitudinal axis) and are hereafter handled as pieces of abnormal noise data of predetermined abnormal noise classes (abnormal noise class n).

The data generation unit 212 selects the first abnormal noise data D1 from the first to eighth abnormal noise data D1 to D8 as reference sound pressure data and converts the first abnormal noise data D1 into data on a spectrogram (power spectrogram) SP1 where the lateral axis represents the time t; the longitudinal axis represents the frequency f; and the sound pressure value is represented by the difference in color or the difference in color depth on an image.

The data generation unit 212 also calculates the phase delay values of the abnormal noise data D1 with respect to the second to eighth abnormal noise data D2 to D8, that is, seven pieces of phase difference data (D2-D1, D3-D1, . . . and D8-D1) representing the phase differences θ between the second to eighth abnormal noise data D2 to D8 and the first abnormal noise data D1. The phase difference θ has a correlation with the abnormal noise generation direction. Accordingly, by calculating phase difference data, the data generation unit 212 is able to identify the abnormal noise generation direction (the position of the abnormal noise source) with respect to the internal microphone 13.

The data generation unit 212 also converts the pieces of phase difference data (D2-D1, D3-D1, . . . and D8-D1) into data on seven spectrograms (phase difference spectrograms) SP2 to SP8 where the lateral axis represents the time t; the longitudinal axis represents the frequency f; and the value of the phase difference θ is represented by the difference in color or the difference in color depth on an image. Note that the same phase difference (θ=0) may be represented by two values (θ=0, 2π) and therefore it is not preferred to directly use the phase difference spectrograms SP2 to SP8 as learning models.

For this reason, the data generation unit 212 further converts the data on the phase difference spectrograms SP2 to SP8 into data on sin θ spectrograms (sin phase difference spectrograms) SP2a to SP8a where sin θ represents the sine value of the phase difference θ and data on cos θ spectrograms (cos phase difference spectrograms) SP2b to SP8b where cos θ represents the cosine value of the phase difference θ. That is, the data generation unit 212 generates the spectrograms SP2a to SP8a and SP2b to SP8b where the lateral axis represents the time t; the longitudinal axis represents the frequency f; and the values of the sin θ and cos θ are represented by the difference in color or the difference in color depth on an image. The data generation unit 212 then generates the learning model Mn of the abnormal noise class n on the basis of the generated data on the power spectrogram SP1 and the data on the sin phase difference spectrograms SP2a to SP8a and cos phase difference spectrograms SP2b to SP8b and stores the learning model Mn in the storage unit 231 (FIG. 6).

Although not shown, the data generation unit 212 also sequentially selects the second to eighth abnormal noise data D2 to D8 as reference sound pressure data and performs data processing in a manner similar to that described above. That is, although data processing is performed on the basis of the phase difference with respect to the abnormal noise data D1 in FIG. 7. However, although not shown, data processing is performed such that spectrograms of the sound pressure and phase difference are generated on the basis of the phase difference with respect to the second to eighth abnormal noise data D2 to D8 for each abnormal noise class n. The data generation unit 212 may select only the abnormal noise data D1 as reference sound pressure data and perform data processing. For convenience, only an example in which the data generation unit 212 selects the abnormal noise data D1 as reference sound pressure data, performs data processing, and generates the learning model Mn will be described below.

In the manner described above, the learning model Mn of the abnormal noise class n is generated. Similarly, the data generation unit 212 generates learning models of other abnormal noise classes on the basis of the abnormal noise data acquired by the data acquisition unit 211 and stores the learning models in the storage unit 231. The data generation unit 212 also generates a learning model of the abnormal noise class 0 on the basis of the normal noise data acquired by the data acquisition unit 211 and stores the learning model in the storage unit 231. Thus, the learning models M0 to MN of the abnormal noise classes 0 to N are stored in the storage unit 231.

Although not shown, the data generation unit 222 of FIG. 6 also generates spectrograms of the traveling noise data, as with the data generation unit 212. Specifically, the data generation unit 222 generates data on a power spectrogram of the traveling noise data and data on sin phase difference spectrograms and cos phase difference spectrograms thereof. More specifically, the data generation unit 222 generates data on a power spectrogram on the basis of first traveling noise data acquired by the first microphone 131 in the inspection travel step and similarly generates data on sin phase difference spectrograms and cos phase difference spectrograms on the basis of the phase differences between second to eighth traveling noise data acquired by the second to eighth microphones 132 to 138 and the first traveling noise data. The data generation unit 222 then generates a measurement model to be compared with the learning models M0 to MN.

The comparator 23 makes comparisons between the learning models received from the data processor 21 and the measurement model received from the data processor 22 through machine learning (deep learning) processing. Specifically, the comparator 23 extracts the feature values on the images of both models and makes comparisons between the power spectrograms of both models and between the sin phase difference and cos phase difference spectrograms thereof. The comparator 23 then determines whether the measurement model matches the learning model of one of the abnormal noise classes 0 to N in all of the power spectrograms, sin phase difference spectrograms, and cos phase difference spectrograms. That is, the comparator 23 determines whether the strengths of the sound pressures match each other and whether the sound pressure generation directions match each other. This determination is a determination as to whether the traveling noise data includes abnormal noise.

The output unit 24 outputs the determination made by the comparator 23 to the external device 6 (FIG. 1). If the comparator 23 determines that the measurement model matches one of the learning models M1 to MN, it outputs the corresponding abnormal noise class (e.g., the abnormal noise class n). This allows the worker to recognize that the measurement data includes abnormal noise and to easily recognize the type of abnormal noise. If there is no learning model that matches the measurement model, the output unit 24 outputs the abnormal noise class 0.

Figure 8:
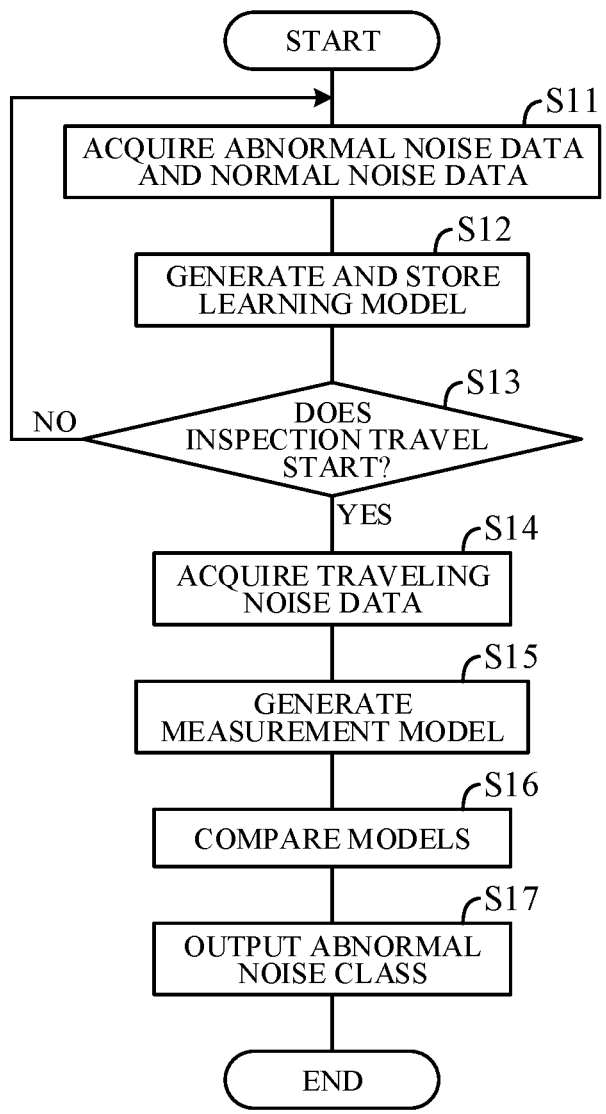
FIG. 8 is a flowchart showing an example of processing by the abnormal noise determination apparatus according to the embodiment of the invention.

FIG. 8 is a flowchart showing an example of a process performed by the CPU of the abnormal noise determination apparatus 20 according to the present embodiment. The process of FIG. 8 is a process corresponding to an abnormal noise determination method according to the present embodiment. First, in S11 (S: process step), the abnormal noise determination apparatus 20 acquires the abnormal noise data and normal noise data generated by the abnormal noise generation apparatus 10. Then, in S12, the abnormal noise determination apparatus 20 generates the learning models on the basis of the abnormal noise data acquired in S11. Specifically, as shown in FIG. 7, the abnormal noise determination apparatus 20 generates the power spectrogram SP1, sin phase difference spectrograms SP2a to SP8a, and cos phase difference spectrograms SP2b to SP8b on the basis of the first to eighth abnormal noise data D1 to D8. The abnormal noise determination apparatus 20 then generates the learning models M1 to MN on the basis of the spectrograms SP1, SP2a to SP8a, and SP2b to SP8b and stores the learning models M1 to MN in the storage unit 231 together with information on the abnormal noise classes. The abnormal noise determination apparatus 20 also generates the learning model M0 on the basis of the spectrogram of the normal noise data acquired in S11 and stores the learning model M0 in the storage unit 231.

Then, in S13, the abnormal noise determination apparatus 20 determines whether the inspection travel step in which the inspection vehicle 1 is caused to travel on the inspection course having the predetermined road surface 2 at the predetermined speed has been started. For example, the inspection travel step is started when an inspection start command is inputted through the input device 11. In this case, the abnormal noise determination apparatus 20 determines whether the predetermined signal has been inputted through the input device 11. If the determination in S13 is YES, the process proceeds to S14; if the determination in S13 is NO, the process returns to S11.

In S14, the abnormal noise determination apparatus 20 acquires the traveling noise data obtained in the inspection travel step. Then, in S15, the abnormal noise determination apparatus 20 generates the measurement model on the basis of the traveling noise data acquired in S14. Specifically, the abnormal noise determination apparatus 20 generates the power spectrogram, sin phase difference spectrograms, and cos phase difference spectrograms of the traveling noise data on the basis of the first to eighth traveling noise data acquired by the microphones 131 to 138 and generates the measurement model corresponding to the learning models on the basis of these spectrograms.

Then, in S16, the abnormal noise determination apparatus 20 uses machine learning to make a comparison between the multiple learning models M0 to MN generated in S12 and the measurement model generated in S15. That is, the abnormal noise determination apparatus 20 determines whether the measurement model matches one of the learning models. This determination corresponds to a determination as to whether the inspection vehicle 1 has outputted traveling noise of one of the abnormal noise classes 0 to N. Then, in S17, the abnormal noise determination apparatus 20 outputs the abnormal noise class determined in S16 to the external device 6. For example, if it is determined in S16 that there is abnormal noise, one of the abnormal noise classes 1 to N is outputted; if it is determined that there is no abnormal noise, the abnormal noise class 0 is outputted. Thus, the process of determining whether abnormal noise is generated in the inspection vehicle 1 is ended.

The present embodiment can achieve advantages and effects such as the following:

(1) The abnormal noise determination apparatus 20 includes: the internal microphone 13 consisting of a microphone array including the multiple microphones 131 to 138 disposed in the inspection vehicle 1; the data acquisition unit 211 that acquires the abnormal noise data that is the data on the abnormal noise generated by the sound sources disposed in the predetermined positions P1 to P9 in the inspection vehicle 1 and that includes information on the strength and generation direction of the abnormal noise previously collected by the internal microphone 13 or supposed to be collected by the internal microphone 13; the data acquisition unit 221 that acquires the traveling noise data including information on the strength and generation direction of the traveling noise collected by the internal microphone 13 during travel of the inspection vehicle 1; and the comparator 23 (determination unit) that determines whether the traveling noise of the inspection vehicle 1 includes abnormal noise, on the basis of the acquired abnormal noise data and traveling noise data (FIGS. 4 and 6). This configuration is able to determine whether abnormal noise is generated, considering not only the strength of the abnormal noise but also the generation direction thereof and thus to accurately determine whether abnormal noise is generated in the inspection vehicle 1.

(2) The data processor 21 includes the data generation unit 212 that generates the sound pressure data indicating the strength of the abnormal noise previously collected by the multiple microphones 131 to 138 or supposed to be collected by the microphones 131 to 138 (i.e., the data on the power spectrogram SP1) and the data on the phase difference data indicating the phase difference of the abnormal noise (i.e., the data on the phase difference spectrograms SP2 to SP8), on the basis of the abnormal noise data acquired by the data acquisition unit 211 (FIG. 7). The data processor 22 includes the data generation unit 222 that generates the sound pressure data indicating the strength of the traveling noise previously collected by the multiple microphones 131 to 138 (i.e., the data on the power spectrogram) and the phase difference data indicating the phase difference of the traveling noise (i.e., the data on the phase difference spectrograms), on the basis of the traveling noise data acquired by the data acquisition unit 221 (FIG. 7). The comparator 23 determines whether the traveling noise of the inspection vehicle 1 includes abnormal noise, on the basis of the sound pressure data and phase difference data generated by the data generation unit 212 and the sound pressure data and phase difference data generated by the data generation unit 222 (FIG. 8). Use of the sound pressure data and phase difference data as described above allows for favorably determining whether abnormal noise is generated in the inspection vehicle 1, considering the strength and generation direction of the abnormal noise.

(3) The data generation unit 212 converts the sound pressure data and phase difference data of the abnormal noise into spectrogram data, while the data generation unit 222 converts the sound pressure data and phase difference data of the traveling noise into pieces of spectrogram data (FIG. 7). The comparator 23 determines whether the traveling noise of the inspection vehicle 1 includes abnormal noise, on the basis of the generated pieces of data. This configuration allows for efficiently making a comparison between the learning models and measurement model using deep learning or the like and thus easily and accurately determining whether abnormal noise is generated.

(4) The abnormal noise data is the noise data generated on the basis of the reference abnormal noise data corresponding to the parts 3 and 4 generated when the abnormal noise generation test is previously conducted outside the inspection vehicle 1 using the parts (first part 3, second part 4) mounted on the predetermined positions P1 to P9 of the inspection vehicle 1, the degrees of attenuation of the sounds transmitted from the predetermined positions P1 to P9 to the microphones 131 to 138 in the inspection vehicle 1, and the normal noise data collected by the microphones 131 to 138 when the reference vehicle 1a travels under a predetermined condition, i.e., at the predetermined speed (FIG. 5). This allows for previously easily generating various types of abnormal noise data and thus more accurately determining whether abnormal noise is generated using the learning models.

(5) The abnormal noise determination method includes: the abnormal noise acquisition step (S11) of acquiring the abnormal noise data that is data on the abnormal noise generated by the sound sources disposed in the predetermined positions P1 to P9 in the inspection vehicle 1 and that includes information on the strength and generation direction of the abnormal noise previously collected by the internal microphone 13 consisting of a microphone array including the multiple microphones 131 to 138 disposed in the inspection vehicle 1 or supposed to be collected by the internal microphone 13; the traveling noise acquisition step (S14) of acquiring the traveling noise data including information on the strength and generation direction of the traveling noise collected by the internal microphone 13 during travel of the inspection vehicle 1; and the determination step (S16) of determining whether the traveling noise of the inspection vehicle 1 includes abnormal noise, on the basis of the abnormal noise data acquired in the abnormal noise acquisition step and the traveling noise data acquired in the traveling noise acquisition step. This allows for accurately determining whether abnormal noise is occurring during travel of the inspection vehicle.

While, in the above embodiment, the data generation unit 212 generates the data on the power spectrogram SP1 of the abnormal noise as a first sound pressure data indicating the strength of the abnormal noise and also generates the data on the phase difference spectrograms SP2 to SP8 of the abnormal noise as a first phase difference data indicating the phase difference of the abnormal noise, the data generated by a first data generation unit is not limited to the spectrogram data converted from the abnormal noise data. That is, the first data generation unit may have any configuration as long as it generates data indicating the strength and phase difference of the abnormal noise.

While, in the above embodiment, the data generation unit 222 generates the data on the power spectrogram of the traveling noise as a second sound pressure data indicating the strength of the traveling noise and also generates the data on the phase difference spectrograms of the traveling noise as a second phase difference data indicating the phase difference of the traveling noise, the data generated by a second data generation unit is not limited to the spectrogram data converted from the traveling noise data. That is, the second data generation unit may have any configuration as long as it generates data indicating the strength and phase difference of the traveling noise.

Accordingly, the comparator 23 serving as a determination unit also need not have the above configuration. Specifically, the determination unit may have any configuration as long as it determines whether the traveling noise of the inspection vehicle 1 includes abnormal noise, on the basis of the abnormal noise data including the information on the strength and generation direction of the abnormal noise acquired by the data acquisition unit 211 serving as a first data acquisition unit and the traveling noise data including the information on the strength and generation direction of the traveling noise acquired by the data acquisition unit 221 serving as a second data acquisition unit. Also, the determination unit may determine whether abnormal noise is generated, without comparing the abnormal noise data and traveling noise data.

While, in the above embodiment, the traveling noise data and normal noise data of the vehicle are acquired by the internal microphone 13 consisting of a microphone array including eight mikes and abnormal noise data generation and the like are performed on the basis of the acquired noise data, the number of mikes of the internal microphone need not be that described above and only has to be two or more. While, in the above embodiment, the normal noise data is acquired by previously causing the reference vehicle 1a to travel, the normal noise data may be acquired by previously causing the inspection vehicle 1 to travel. That is, the vehicle used to obtain the normal noise data may be any of the reference vehicle 1a and inspection vehicle 1. While, in the above embodiment, the abnormal noise determination apparatus 20 determines whether abnormal noise is generated in the inspection vehicle 1, the abnormal noise determination apparatus according to the present invention can also be used when determining whether abnormal noise is generated in a vehicle other than the inspection vehicle.

The above embodiment can be combined as desired with one or more of the above modifications. The modifications can also be combined with one another.

According to the present invention, it is possible to easily and accurately determine whether abnormal noise is generated.

Above, while the present invention has been described with reference to the preferred embodiments thereof, it will be understood, by those skilled in the art, that various changes and modifications may be made thereto without departing from the scope of the appended claims.

What is claimed is:

1. An abnormal noise determination apparatus, comprising:
  a microphone array disposed inside a vehicle and including a plurality of microphones; and
  an electronic control unit including a microprocessor and a memory connected to the microprocessor, wherein
  the microprocessor is configured to perform:
  acquiring abnormal noise data on an abnormal noise generated by a sound source disposed in a predetermined position inside the vehicle, the abnormal noise data including information on a strength and a generation direction of the abnormal noise collected by the microphone array in advance or assumed to be collected by the microphone array;
  acquiring traveling noise data including information on a strength and a generation direction of a traveling noise collected by the microphone array during traveling of the vehicle; and
  determining whether the abnormal noise is included in the traveling noise of the vehicle, based on the abnormal noise data acquired and the traveling noise data acquired.

2. The abnormal noise determination apparatus according to claim 1, wherein
  the microprocessor is configured to further perform:
  generating first sound pressure data indicating the strength of the abnormal noise and first phase difference data indicating a phase difference of the abnormal noise collected by the plurality of microphones in advance or assumed to be collected by the plurality of microphones, based on the abnormal noise data acquired; and
  generating second sound pressure data indicating the strength of the traveling noise and second phase difference data indicating a phase difference of the traveling noise collected by the plurality of microphones, based on the traveling noise data acquired, and wherein
  the microprocessor is configured to perform
  the determining including determining whether the abnormal noise is included in the traveling noise of the vehicle, based on the first sound pressure data, the first phase difference data, the second sound pressure data and the second phase difference data.

3. The abnormal noise determination apparatus according to claim 2, wherein
the microprocessor is configured to perform
the generating the first sound pressure data and the first phase difference data including converting the first sound pressure data and the first phase difference data into spectrogram data,
the generating the second sound pressure data and the second phase difference data including converting the second sound pressure data and the second phase difference data into spectrogram data, and
the determining including determining whether the abnormal noise is included in the traveling noise of the vehicle based on the spectrogram data converted.

4. The abnormal noise determination apparatus according to claim 1, wherein
the abnormal noise data is generated based on reference abnormal noise data generated in a part when an abnormal noise generation test is performed in advance outside the vehicle using the part mounted on a predetermined position of the vehicle, a degree of an attenuation of a sound transmitted from the predetermined position to the microphone array inside the vehicle, and normal noise data on a normal noise collected by the microphone array when the vehicle travels under a predetermined condition.

5. The abnormal noise determination apparatus according to claim 4, wherein
the abnormal noise data is generated by adding the normal noise data to a multiplication value obtained by multiplying the reference abnormal noise data by a transfer function of the sound transmitted from the predetermined position to the microphone array inside the vehicle.

6. The abnormal noise determination apparatus according to claim 4, wherein
the abnormal noise data includes abnormal noise data acquired by the microphone array when the vehicle travels under the predetermined condition.

7. An abnormal noise determination apparatus, comprising:
a microphone array disposed inside a vehicle and including a plurality of microphones; and
an electronic control unit including a microprocessor and a memory connected to the microprocessor, wherein
the microprocessor is configured to function as:
a first data acquisition unit configured to acquire abnormal noise data on an abnormal noise generated by a sound source disposed in a predetermined position inside the vehicle, the abnormal noise data including information on a strength and a generation direction of the abnormal noise collected by the microphone array in advance or assumed to be collected by the microphone array;
a second data acquisition unit configured to acquire traveling noise data including information on a strength and a generation direction of a traveling noise collected by the microphone array during traveling of the vehicle; and
a determination unit configured to determine whether the abnormal noise is included in the traveling noise of the vehicle, based on the abnormal noise data acquired by the first data acquisition unit and the traveling noise data acquired by the second data acquisition unit.

8. The abnormal noise determination apparatus according to claim 7, wherein
the microprocessor is further configured to function as:
a first data generation unit configured to generate first sound pressure data indicating the strength of the abnormal noise and first phase difference data indicating a phase difference of the abnormal noise collected by the plurality of microphones in advance or assumed to be collected by the plurality of microphones, based on the abnormal noise data acquired by the first data acquisition unit; and
a second data generation unit configured to generate second sound pressure data indicating the strength of the traveling noise and second phase difference data indicating a phase difference of the traveling noise collected by the plurality of microphones, based on the traveling noise data acquired by the second data acquisition unit, and wherein
the determination unit is configured to determine whether the abnormal noise is included in the traveling noise of the vehicle based on the first sound pressure data and the first phase difference data generated by the first data generation unit and the second sound pressure data and the second phase difference data generated by the second data generation unit.

9. The abnormal noise determination apparatus according to claim 8, wherein
the first data generation unit is configured to convert the first sound pressure data and the first phase difference data into spectrogram data,
the second data generation unit is configured to convert the second sound pressure data and the second phase difference data into spectrogram data, and
the determination unit is configured to determine whether the abnormal noise is included in the traveling noise of the vehicle, based on the spectrogram data converted in the first data generation unit and the spectrogram data converted in the second data generation unit.

10. The abnormal noise determination apparatus according to claim 7, wherein
the abnormal noise data is generated based on reference abnormal noise data generated in a part when an abnormal noise generation test is performed in advance outside the vehicle using the part mounted on a predetermined position of the vehicle, a degree of an attenuation of a sound transmitted from the predetermined position to the microphone array inside the vehicle, and normal noise data on a normal noise collected by the microphone array when the vehicle travels under a predetermined condition.

11. The abnormal noise determination apparatus according to claim 10, wherein
the abnormal noise data is generated by adding the normal noise data to a multiplication value obtained by multiplying the reference abnormal noise data by a transfer function of the sound transmitted from the predetermined position to the microphone array inside the vehicle.

12. The abnormal noise determination apparatus according to claim 10, wherein
the abnormal noise data includes abnormal noise data acquired by the microphone array when the vehicle travels under the predetermined condition.

13. An abnormal noise determination method, comprising:
acquiring abnormal noise data on an abnormal noise generated by a sound source disposed in a predetermined position inside a vehicle, the abnormal noise data including information on a strength and a generation direction of the abnormal noise collected by a microphone array disposed inside the vehicle and including a plurality of microphones in advance or assumed to be collected by the microphone array;

acquiring traveling noise data including information on a strength and a generation direction of a traveling noise collected by the microphone array during traveling of the vehicle; and determining whether the abnormal noise is included in the traveling noise of the vehicle, based on the abnormal noise data acquired and the traveling noise data acquired.

\* \* \* \* \*